US010057127B2

(12) United States Patent
Zhu et al.

(10) Patent No.: US 10,057,127 B2
(45) Date of Patent: Aug. 21, 2018

(54) PROCESSING METHOD FOR SERVICE ALLOCATION AND RELATED APPARATUS

(71) Applicant: HUAWEI TECHNOLOGIES CO., LTD, Shenzhen, Guangdong (CN)

(72) Inventors: Lei Zhu, Beijing (CN); Anni Wei, Beijing (CN); Wanqiang Zhang, Munich (DE)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 58 days.

(21) Appl. No.: 15/270,923

(22) Filed: Sep. 20, 2016

(65) Prior Publication Data

US 2017/0012823 A1 Jan. 12, 2017

Related U.S. Application Data

(63) Continuation of application No. PCT/CN2014/073881, filed on Mar. 21, 2014.

(51) Int. Cl.
*H04L 12/24* (2006.01)
*H04W 28/08* (2009.01)
(Continued)

(52) U.S. Cl.
CPC ...... *H04L 41/0893* (2013.01); *H04L 41/0816* (2013.01); *H04L 67/16* (2013.01); *H04W 24/02* (2013.01); *H04W 28/08* (2013.01)

(58) Field of Classification Search
CPC . G06F 3/067; H04L 41/0893; H04L 65/1006; H04L 67/2814
See application file for complete search history.

(56) References Cited

U.S. PATENT DOCUMENTS 7,835,348 B2 * 11/2010 Kasralikar .......... H04L 63/1408
370/360
2010/0124933 A1 5/2010 Chowdhury et al.
2014/0036665 A1 2/2014 Chowdhury et al.

FOREIGN PATENT DOCUMENTS

CN 101232503 A 7/2008
CN 101605316 A 12/2009
(Continued)

OTHER PUBLICATIONS

KR Application No. 10-2016-7027067, Office Action, dated Jun. 23, 2017.
(Continued)

*Primary Examiner* — Chandrahas B Patel
(74) *Attorney, Agent, or Firm* — Womble Bond Dickinson (US) LLP

(57) ABSTRACT

Some embodiments of the present invention disclose a processing method for service allocation and a related apparatus. The method may include receiving service logic update information that is obtained after configuration update is performed on a functional entity in a network, searching for initial service logic information already stored at a local end, and generating a system service logic policy according to the service logic update information and the initial service logic information. The method may also include sending the system service logic policy to service entities in the network that execute service processing, where the system service logic policy is used to instruct the service entities in the network to execute service allocation on the functional entity in the network.

13 Claims, 9 Drawing Sheets

(51) Int. Cl.
*H04W 24/02* (2009.01)
*H04L 29/08* (2006.01)

(56) References Cited

FOREIGN PATENT DOCUMENTS

| CN | 102084705 A | 6/2011 |
| CN | 102264154 A | 11/2011 |
| WO | 2013016189 A1 | 1/2013 |

OTHER PUBLICATIONS

ETSI, "Network Functions Virtualisation (NFV); Architectual Framework", ETSI GS NFV 002 V1.1.1, Oct. 2013.
ETSI, "Network Functions Virtualisation (NFV); Use Cases", ETSI GS NFV 001 V1.1.1, Oct. 2013.
PCT/CN2014/073881, International Search Report dated Dec. 24, 2014.
PCT/CN2014073881, Extended European Search Report, dated Feb. 17, 2017, pp. 1-16.
ETSI, "Network Function Virtualization (NFV) Management and Orchestration", GS NFV-MAN 001 V0.3.5, Mar. 18, 2014, pp. 1-136.

\* cited by examiner

PROCESSING METHOD FOR SERVICE ALLOCATION AND RELATED APPARATUS

CROSS-REFERENCE TO RELATED APPLICATIONS

This application is a continuation of International Application No. PCT/CN2014/073881, filed on Mar. 21, 2014, which is hereby incorporated by reference in its entirety.

TECHNICAL FIELD

The disclosure relates to the field of communications technologies, and in particular, to a processing method for service allocation and a related apparatus.

BACKGROUND

Recently, a network function virtualization (NFV) working group consisting of international mainstream operators is officially set up for the purpose of promoting demands. The working group is set up to define demands on network function virtualization of the operators and related technical reports, and implement some network functions in common high performance servers, switches, and memories with reference to IT virtualization technologies. Scenarios concerned about by the working group includes a broadband network gateway (BNG), Carrier Grade Network Address Translation (CG-NAT), a router, an evolved packet core (EPC), an IP multimedia network subsystem (IMS), a radio access network (RAN), a home network, and the like.

Various types of network devices such as a server, a storage device, and a switch all can implement separation of software and hardware by using an NFV technology, and completely separate software defining a network function from a common high performance hardware server, a memory, and a network switch, to obtain a virtualized functional entity virtualized network function (VNF). A network function is implemented in a software manner by using the NFV technology, can run on common server hardware, and may be migrated, instantiated, or deployed at different positions in a network as needed, without the need of installing a new device, for example, may be deployed in a data center, a network node, or a house of a user. A software device can be completely automatically and remotely installed and managed based on common hardware. Moreover, an operator may provide a faster and better network service by implementing separation of software and hardware.

In a Long Term Evolution (LTE) network, one eNodeB may establish a connection to multiple MMEs in a mobility management entity (MME) pool. According to a function of load balance between MMEs, user equipment (UE) that newly enters the MME pool is allowed to be directed to a suitable MME in the pool according to load balance between the MMEs in the pool. To select a suitable MME, an eNodeB needs to learn a load status of the MMEs in the pool, and set weight information for the MME on the eNodeB according to an indication of the MME. For example, a new MME is added to the MME pool, and a weight value of the MME may be set to a very high value, to increase load of the MME as soon as possible. When the load reaches a set value, the MME instructs the eNodeB to reduce a weight.

In a current manner, one eNodeB is responsible for service logic configuration of only a single MME, and cannot acquire information about an entire network; therefore, service allocation is performed only for a single MME, and a requirement for load balance cannot be satisfied.

SUMMARY

Some embodiments of the present invention provide a processing method for service allocation and a related apparatus, so that service allocation can be performed based on a system service logic policy that is obtained by functional entities in a network, thereby better satisfying a requirement for load balance.

According to a first aspect, an embodiment of the present invention provides a processing method for service allocation, including:

receiving, by a network device, service logic update information that is obtained after a configuration update is performed on a functional entity in a network;

searching for initial service logic information already stored locally on the network device, and generating a system service logic policy according to the service logic update information and the initial service logic information; and sending the system service logic policy to service entities in the network that execute service processing, where the system service logic policy is used to instruct the service entities in the network to execute service allocation on the functional entity in the network.

With reference to the first aspect, in a first possible implementation manner, the sending the system service logic policy to service entities in the network that execute service processing includes:

sending the system service logic policy to mobility management entities MMEs in the network that are obtained after the configuration update is performed, so that the mobility management entities MMEs execute service allocation on the functional entity in the network according to the system service logic policy.

With reference to the first aspect, in a second possible implementation manner, the sending the system service logic policy to service entities in the network that execute service processing includes:

sending the system service logic policy to base stations in the network, so that the base stations execute service allocation on the functional entity in the network according to the system service logic policy.

With reference to the first aspect, in a third possible implementation manner, the sending the system service logic policy to service entities in the network that execute service processing includes:

sending the system service logic policy to a virtualized network function management entity VNFM, so that the virtualized network function management entity VNFM executes service allocation on the functional entity in the network according to the system service logic policy.

With reference to the first aspect, or the first possible implementation manner of the first aspect, or the second possible implementation manner of the first aspect, or the third possible implementation manner of the first aspect, in a fourth possible implementation manner, the service logic update information includes any one or more of: configuration information that is obtained after the configuration update is performed on the functional entity in the network, or link information or service selection policy information that corresponds to the functional entity, and wherein the configuration update includes adding, modifying, or deleting the functional entity in the network.

According to a second aspect, an embodiment of the present invention further provides another processing method for service allocation, including:

receiving a system service logic policy sent by a service policy entity;

adjusting service parameter information according to the received system service logic policy, where the service parameter information includes a weighting factor; and sending the adjusted service parameter information to a corresponding base station, so that the base station performs service allocation according to the service parameter information.

According to a third aspect, an embodiment of the present invention further provides still another processing method for service allocation, including:

receiving a configuration update request that carries configuration information of a target functional entity, and loading the target functional entity corresponding to the configuration update request;

configuring the target functional entity according to the configuration information of the target functional entity, to complete configuration update on a functional entity in a network; and acquiring service logic update information corresponding to the target functional entity, to perform service allocation according to the service logic update information.

With reference to the third aspect, in a first possible implementation manner, the receiving a configuration update request that carries configuration information of a target functional entity, and loading the target functional entity corresponding to the configuration update request includes:

when receiving the configuration update request that carries the configuration information of the target functional entity, acquiring a network service descriptor NSD and a virtualized network function configuration file VNFD that correspond to the target functional entity; and loading the network service descriptor NSD and the virtualized network function configuration file VNFD that correspond to the target functional entity to a network function virtualization NFV catalog, where at least one of the network service descriptor NSD and the virtualized network function configuration file VNFD records the service logic update information that includes link information and a service selection policy that correspond to the target functional entity.

With reference to the third aspect, in a second possible implementation manner, the configuring the target functional entity according to the configuration information of the target functional entity, to complete configuration update on a functional entity in a network includes:

configuring a virtualized network function forwarding graph VNFFG and a network function instance for the target functional entity; and updating a network service database according to the configured virtualized network function forwarding graph VNFFG and the configured network function instance, to complete the configuration update on the functional entity in the network.

According to a fourth aspect, an embodiment of the present invention further provides a processing apparatus for service allocation, including:

an information receiving module, configured to receive service logic update information that is obtained after a configuration update is performed on a functional entity in a network;

a policy generation module, configured to search for initial service logic information already stored at a local end, and generate a system service logic policy according to the service logic update information and the initial service logic information; and a policy sending module, configured to send the system service logic policy to service entities in the network that execute service processing, to instruct the service entities in the network to execute service allocation on the functional entity in the network.

With reference to the fourth aspect, in a first possible implementation manner, the policy sending module is specifically configured to send the system service logic policy to mobility management entities MMEs in the network that are obtained after the configuration update is performed, so that the mobility management entities MMEs execute service allocation on the functional entity in the network according to the system service logic policy.

With reference to the fourth aspect, in a second possible implementation manner, the policy sending module is specifically configured to send the system service logic policy to base stations in the network, so that the base stations execute service allocation on the functional entity in the network according to the system service logic policy.

With reference to the fourth aspect, in a third possible implementation manner, the policy sending module is specifically configured to send the system service logic policy to a virtualized network function management entity VNFM, so that the virtualized network function management entity VNFM executes service allocation on the functional entity in the network according to the system service logic policy.

With reference to the fourth aspect, or the first possible implementation manner of the fourth aspect, or the second possible implementation manner of the fourth aspect, or the third possible implementation manner of the fourth aspect, in a fourth possible implementation manner, the service logic update information includes any one or more of: configuration information that is obtained after the configuration update is performed on the functional entity in the network, or link information or service selection policy information that corresponds to the functional entity, and wherein the configuration update includes adding, modifying, or deleting the functional entity in the network.

According to a fifth aspect, an embodiment of the present invention further provides another processing apparatus for service allocation, including:

a policy receiving module, configured to receive a system service logic policy sent by a service policy entity;

a parameter adjustment module, configured to adjust service parameter information according to the system service logic policy received by the policy receiving module, where the service parameter information includes a weighting factor; and a parameter sending module, configured to send the adjusted service parameter information to a corresponding base station, so that the base station performs service allocation according to the service parameter information.

According to a sixth aspect, an embodiment of the present invention further provides still another processing apparatus for service allocation, including:

an information loading module, configured to receive a configuration update request that carries configuration information of a target functional entity, and load the target functional entity corresponding to the configuration update request;

a configuration update module, configured to configure the target functional entity according to the configuration information of the target functional entity, to complete configuration update on a functional entity in a network; and an information acquiring module, configured to acquire service logic update information corresponding to the target functional entity, to perform service allocation according to the service logic update information.

With reference to the sixth aspect, in a first possible implementation manner, the information loading module includes:

an information acquiring unit, configured to: when the configuration update request that carries the configuration information of the target functional entity is received, acquire a network service descriptor NSD and a virtualized network function configuration file VNFD that correspond to the target functional entity; and a loading execution unit, configured to load the network service descriptor NSD and the virtualized network function configuration file VNFD that correspond to the target functional entity and that are acquired by the information acquiring unit to a network function virtualization NFV catalog, where at least one of the network service descriptor NSD and the virtualized network function configuration file VNFD records the service logic update information that includes link information and a service selection policy that correspond to the target functional entity.

With reference to the sixth aspect, in a second possible implementation manner, the configuration update module includes:

an information configuration unit, configured to configure a virtualized network function forwarding graph VNFFG and a network function instance for the target functional entity; and an information update unit, configured to update a network service database according to the virtualized network function forwarding graph VNFFG and the network function instance that are configured by the information configuration unit, to complete the configuration update on the functional entity in the network.

According to a seventh aspect, an embodiment of the present invention further provides a non-transitory computer-readable storage medium, where the computer storage medium stores instructions (or a program), and the instructions include, when executed, some or all of steps of the processing method for service allocation in the first aspect.

According to an eighth aspect, an embodiment of the present invention further provides a non-transitory computer-readable storage medium, where the computer storage medium stores instructions (or a program), and the instructions include, when executed, some or all of steps of the processing method for service allocation in the second aspect.

According to a ninth aspect, an embodiment of the present invention further provides a non-transitory computer-readable storage medium, where the computer storage medium stores instructions (or a program), and the instructions include, when executed, some or all of steps of the processing method for service allocation in the third aspect.

According to a tenth aspect, an embodiment of the present invention further provides a network device, including: a receiver, a transmitter, a memory, and a processor, where the processor performs the following steps:

receiving, by using the receiver, service logic update information that is obtained after a configuration update is performed on a functional entity in a network;

searching for initial service logic information stored in the memory, and generating a system service logic policy according to the service logic update information and the initial service logic information; and sending, by using the transmitter, the system service logic policy to service entities in the network that execute service processing, where the system service logic policy is used to instruct the service entities in the network to execute service allocation on the functional entity in the network.

With reference to the tenth aspect, in a first possible implementation manner, when performing the step of sending the system service logic policy to service entities in the network that execute service processing, the processor specifically performs the following step:

sending the system service logic policy to mobility management entities MMEs in the network that are obtained after the configuration update is performed, so that the mobility management entities MMEs execute service allocation on the functional entity in the network according to the system service logic policy.

With reference to the tenth aspect, in a second possible implementation manner, when performing the step of sending the system service logic policy to service entities in the network that execute service processing, the processor specifically performs the following step:

sending the system service logic policy to base stations in the network, so that the base stations execute service allocation on the functional entity in the network according to the system service logic policy.

With reference to the tenth aspect, in a third possible implementation manner, when performing the step of sending the system service logic policy to service entities in the network that execute service processing, the processor specifically performs the following step:

sending the system service logic policy to a virtualized network function management entity VNFM, so that the virtualized network function management entity VNFM executes service allocation on the functional entity in the network according to the system service logic policy.

According to an eleventh aspect, an embodiment of the present invention further provides another network device, including: a receiver, a transmitter, a memory, and a processor, where the processor performs the following steps:

receiving, by using the receiver, a system service logic policy sent by a service policy entity;

adjusting service parameter information according to the received system service logic policy, where the service parameter information includes a weighting factor; and sending the adjusted service parameter information to a corresponding base station by using the transmitter, so that the base station performs service allocation according to the service parameter information.

According to a twelfth aspect, an embodiment of the present invention further provides still another network device, including: a receiver, a transmitter, a memory, and a processor, where the processor performs the following steps:

receiving, by using the receiver, a configuration update request that carries configuration information of a target functional entity in a network, and loading the target functional entity corresponding to the configuration update request;

configuring the target functional entity according to the configuration information of the target functional entity, to complete the configuration update on the target functional entity; and acquiring service logic update information corresponding to the target functional entity, to perform service allocation according to the service logic update information.

With reference to the twelfth aspect, in a first possible implementation manner, when performing the step of the receiving a configuration update request that carries configuration information of a target functional entity, and loading the target functional entity corresponding to the configuration update request, the processor specifically performs the following steps:

when receiving the configuration update request that carries the configuration information of the target functional entity, acquiring a network service descriptor NSD and a virtualized network function configuration file VNFD that correspond to the target functional entity; and loading the network service descriptor NSD and the virtualized network function configuration file VNFD that correspond to the target functional entity to a network function virtualization NFV catalog, where at least one of the network service descriptor NSD and the virtualized network function configuration file VNFD records the service logic update information that includes link information and a service selection policy that correspond to the target functional entity.

With reference to the twelfth aspect, in a second possible implementation manner, when performing the step of the configuring the target functional entity according to the configuration information of the target functional entity, to complete configuration update on a functional entity in a network, the processor specifically performs the following steps:

configuring a virtualized network function forwarding graph VNFFG and a network function instance for the target functional entity; and updating a network service database according to the configured virtualized network function forwarding graph VNFFG and the configured network function instance, to complete the configuration update on the functional entity in the network.

Implementation of the embodiments of the present invention may have the following beneficial effect:

In some embodiments of the present invention, a system service logic policy may be generated according to service logic update information that is obtained after configuration update is performed on a functional entity in a network and according to initial service logic information already stored at a local end, and the system service logic policy may be sent to service entities in the network that execute service processing, to instruct the service entities to execute service allocation on a functional entity in the network, thereby better satisfying a requirement for load balance.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
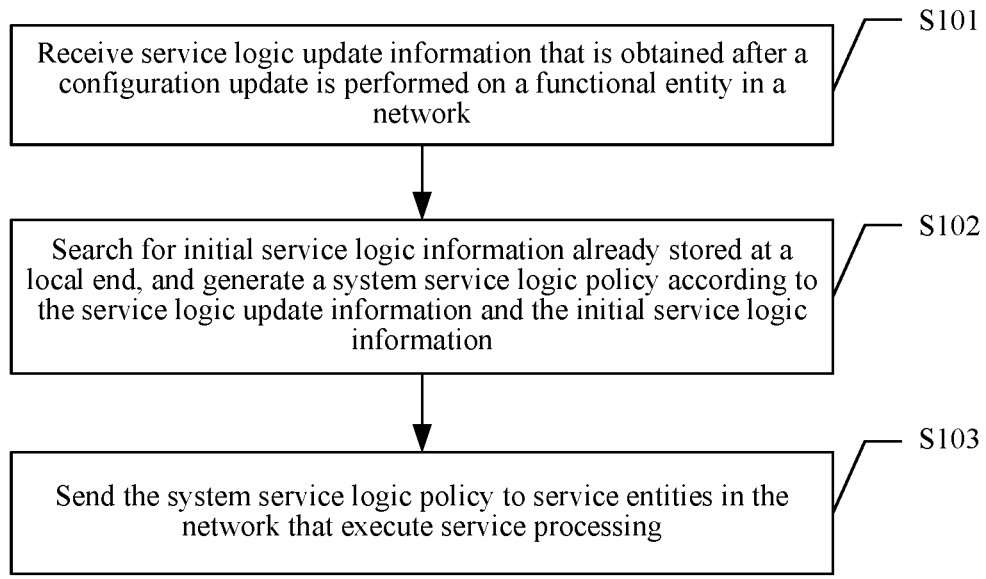
FIG. 1 is a schematic flowchart of an embodiment of a processing method for service allocation according to embodiments of the present invention.

Refer to FIG. 1, which is a schematic flowchart of an embodiment of a processing method for service allocation according to embodiments of the present invention. The method includes:

S101: Receive service logic update information that is obtained after configuration update is performed on a functional entity in a network.

In a specific embodiment, the functional entity may include a network node such as a packet data gateway (PGW), a serving gateway (SGW), an home subscriber server (HSS), an mobility management entity (MME), and the network node may be virtual, that is, a virtualized network function (VNF), or may be physical, that is, a physical network function (PNF).

Specifically, a logical node, that is, a service policy entity configured to perform policy management on a functional entity, may be added to a network function virtualization (NFV) system. The service policy entity may be an independent unit entity, or may be located in an NFV Orchestrator (NFVO) or a domain name system (DNS), or even in a VNF. A deployment position of the service policy entity is not limited in this embodiment of the present invention. Further, the method in this embodiment of the present invention is applicable to the service policy entity.

The service logic update information is information that is obtained after a functional entity such as a VNF in the network on which an update operation needs to be performed completes the update operation and that includes configuration information, link information and service selection policy information that correspond to the VNF, and the like. The update operation includes an adding operation, a modifying operation or a deleting operation.

S102: Search for initial service logic information already stored at a local end, and generate a system service logic policy according to the service logic update information and the initial service logic information.

The system service logic policy is used to instruct service entities in the network to execute service allocation on a functional entity in the network.

In a specific embodiment, the initial service logic information may be service logic information that corresponds to functional entities in the network before the configuration update, and the service logic information may include configuration information, connection information, a service allocation policy, and the like, and the initial service logic information may also be a system service logic policy that corresponds to each functional entity in the network before the configuration update.

S103: Send the system service logic policy to service entities in the network that execute service processing.

After receiving the service logic update information that is obtained after the configuration update is performed on the functional entity in the network, the service policy entity may generate a system service logic policy including a specific service policy with reference to service logic information, already stored at a local end, of another related functional entity, that is, the initial service logic information, and send the system service logic policy to the service entities in the network, to execute service allocation on the functional entity in the network.

Further optionally, the sending the system service logic policy to service entities in the network that execute service processing may be sending the system service logic policy to mobility management entities MMEs in the network that are obtained after configuration update is performed, so that the MMEs execute service allocation on the functional entity in the network according to the system service logic policy, for example, adjust, according to the system service logic policy, service parameter information corresponding to the mobility management entities MMEs, where the service parameter information may include weighting factors corresponding to the MMEs.

Further optionally, the sending the system service logic policy to service entities in the network that execute service processing may also be sending the system service logic policy to base stations in the network, so that the base stations execute service allocation on the functional entity in the network according to the system service logic policy.

Further optionally, the sending the system service logic policy to service entities in the network that execute service processing may also be sending the system service logic policy to a virtualized network function manager (VNFM), so that the VNFM executes service allocation on the functional entity in the network according to the system service logic policy, for example, instructs each functional entity in the network to adjust, according to the system service logic policy, service parameter information corresponding to the functional entity.

In implementation of this embodiment of the present invention, a system service logic policy may be generated according to service logic update information that is obtained after configuration update is performed on a functional entity in a network and according to initial service logic information already stored at a local end, and the system service logic policy may be sent to service entities in the network that execute service processing, to instruct the service entities to execute service allocation on a functional entity in the network, thereby better satisfying a requirement for load balance.

Figure 2:
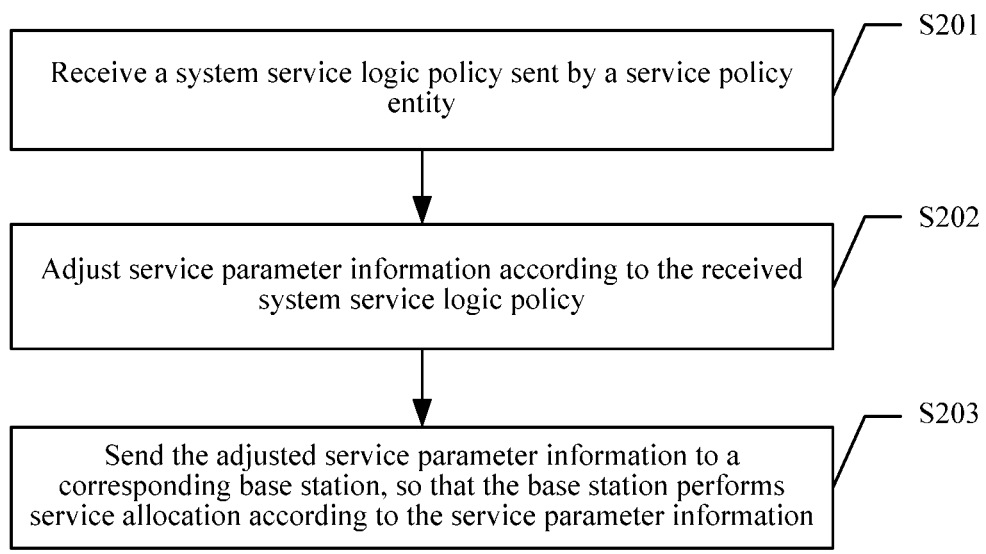
FIG. 2 is a schematic flowchart of an embodiment of another processing method for service allocation according to embodiments of the present invention.

Refer to FIG. 2, which is a schematic flowchart of an embodiment of another processing method for service allocation according to embodiments of the present invention. The method in this embodiment of the present invention is applicable to a functional entity such as an MME, or an HSS. the method includes:

S201: Receive a system service logic policy sent by a service policy entity.

The system service logic policy is used to instruct service entities in a network to execute service allocation on a functional entity in the network, and may include a policy for performing service allocation on functional entities in the network, for example, include a policy for controlling to send a new service or all services of a specified type to a target functional entity, to transfer a service on a particular functional entity to a target functional entity, or allocate services to a functional entity already existing in the network and a target functional entity according to a weighting factor.

S202: Adjust service parameter information according to the received system service logic policy.

The functional entity such as an MME in the network may adjust the service parameter information according to the received system service logic policy, for example, adjust a weighting factor corresponding to each MME. Further, the functional entity may be a VNF, or may be a PNF.

S203: Send the adjusted service parameter information to a corresponding base station, so that the base station performs service allocation according to the service parameter information.

The base station stores service parameter information that corresponds to all MMEs connected to the base station, and performs, according to the service parameter information, allocation for a service request that arrives.

In implementation of this embodiment of the present invention, service parameter information corresponding to a corresponding functional entity may be adjusted according to a received system service logic policy, and the adjusted service parameter information may be pushed to a corresponding base station, to instruct the base station to perform service allocation.

Figure 3:
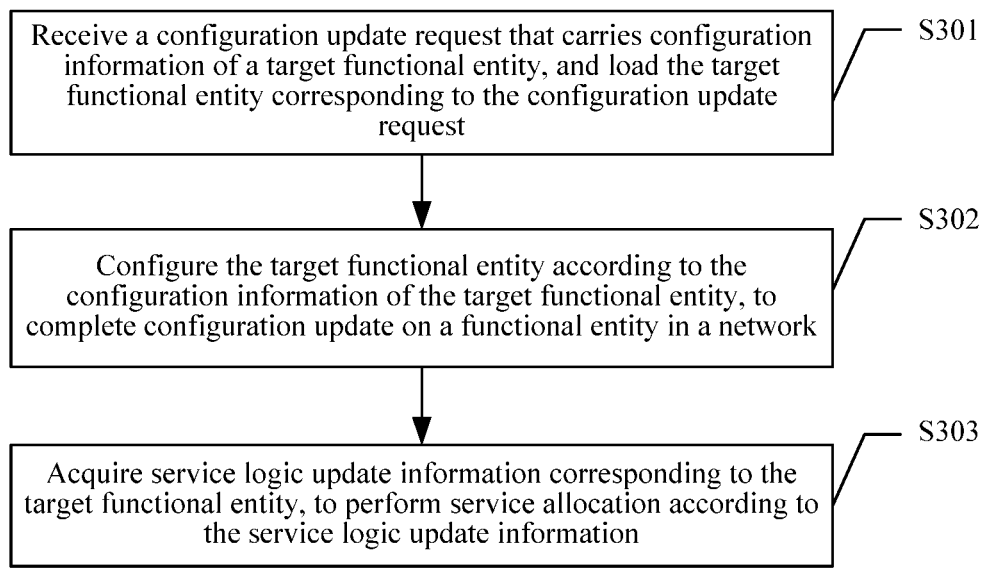
FIG. 3 is a schematic flowchart of an embodiment of still another processing method for service allocation according to embodiments of the present invention.

Refer to FIG. 3, which is a schematic flowchart of an embodiment of still another processing method for service allocation according to embodiments of the present invention. The method in this embodiment of the present invention is applicable to a node such as an configured to configure a related functional entity. The method includes:

S301: Receive a configuration update request that carries configuration information of a target functional entity, and load the target functional entity corresponding to the configuration update request.

If an NFVO receives a configuration update request for adding or modifying a target functional entity such as a target VNF, the NFVO initiates a loading procedure, for example, loads an network service descriptor (NSD) and a virtualized network function configuration file (VNFD) of the target VNF to an NFV catalog.

S302: Configure the target functional entity according to the configuration information of the target functional entity, to complete configuration update on a functional entity in a network.

An instantiation procedure of the target VN is initiated to extend a specific configuration for the target VNF, and a related database in the network is updated.

S303: Acquire service logic update information corresponding to the target functional entity, to perform service allocation according to the service logic update information.

The acquired service logic update information may be sent to a service policy entity, so that the service policy entity instructs, according to the acquired service logic update information, a related functional entity to adjust a forwarding parameter for service allocation.

In implementation of this embodiment of the present invention, configuration update may be performed on a target functional entity according to a received configuration update request, and service logic update information that correspond to the target functional entity after the configuration update may be acquired, so that service allocation is performed according to the service logic update information.

Figure 4:
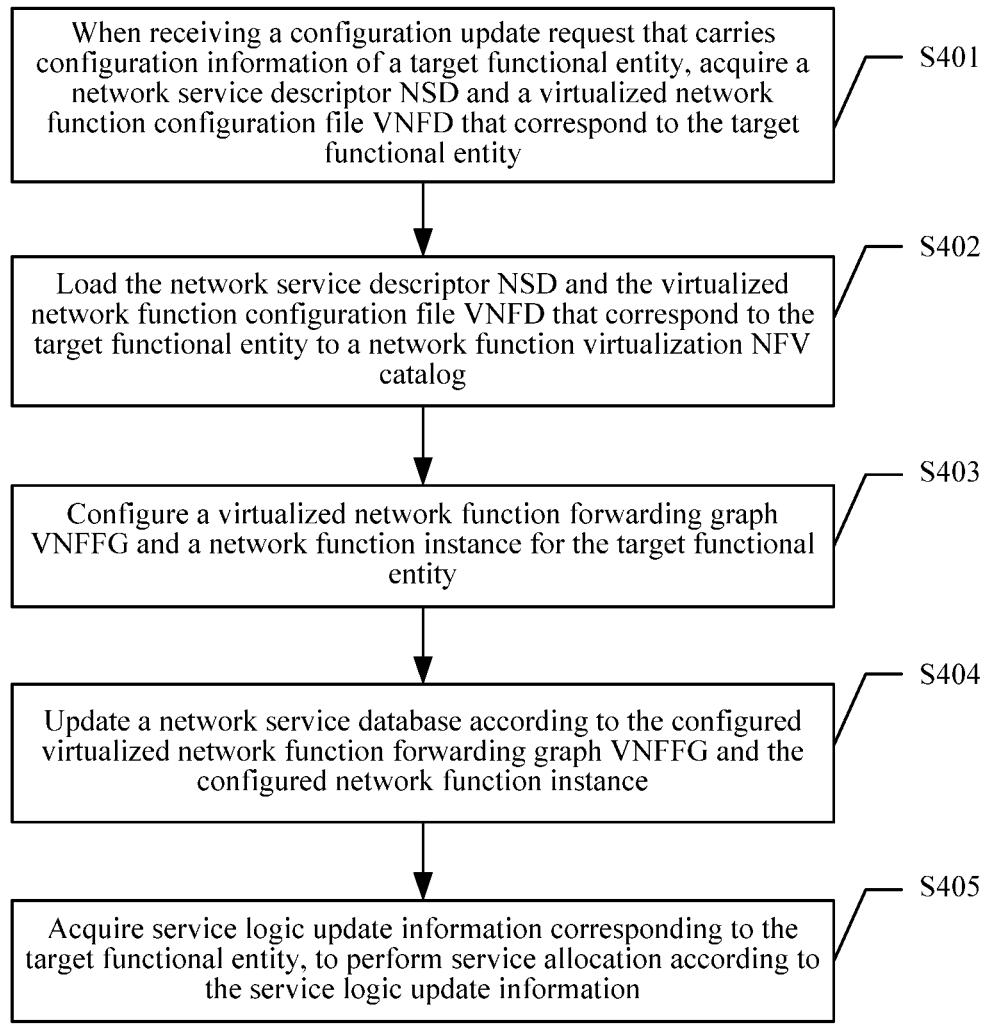
FIG. 4 is a schematic flowchart of an embodiment of yet another processing method for service allocation according to embodiments of the present invention.

Refer to FIG. 4, which is a schematic flowchart of an embodiment of yet another processing method for service allocation according to embodiments of the present invention. The method in this embodiment of the present invention is applicable to a node such as an NFV orchestration (NFVO) configured to configure a related functional entity. The method includes:

S401: When receiving a configuration update request that carries configuration information of a target functional entity, acquire a NSD and a VNFD that correspond to the target functional entity.

If an NFVO receives a configuration update request for adding or modifying a target VNF, the NFVO may acquire an NSD corresponding to the target VNF and a configuration file VNFD of the target VNF, where at least one of the NSD and the configuration file VNFD records service logic update information that includes link information and a service selection policy that correspond to the target VNF, and the like.

S402: Load the NSD and the VNFD that correspond to the target functional entity to a network function virtualization NFV catalog.

Before loading the NSD corresponding to the target VNF to the NFV catalog, a current NSD may be modified by using an orchestration entity NFVO. The modified NSD is submitted to the NFVO, and the NFVO verifies the modified NSD. The verification process includes detecting whether a VNF package corresponding to the VNF exists in a network service (NS), detecting whether a hosted element and an external interface providing a network service exist, and the like.

In a specific embodiment, when the configuration file VNFD corresponding to the target VNF is loaded, a package VNF Package corresponding to the target VNF may be submitted to the NFVO, where the VNF Package includes the virtualized network function configuration file VNFD of the VNF, a software image, another component configured to detect integrity and validity of the package, and the like. The NFVO performs verification processing on the configuration file VNFD, for example, checks whether the hosted element exists, or verifies authenticity and reliability of the VNFD by using a certificate included in the VNFD, to instruct a VNF catalog to load the target VNF to the VNF catalog.

S403: Configure a virtualized network function forwarding graph (VNFFG) and a network function instance for the target functional entity.

Further, after the loading is completed, a network function instantiation procedure may be initiated, to configure the VNFFG and a corresponding VNF instance for the target functional entity such as the target VNF. Specifically, a current NFVO configures, according to the target VNF, a VNFFG used to describe a service flow between network functions. The VNFFG includes a VNF, a physical network function (PNF), and a virtual link between the network functions (or there is no PNF, and all network functions are implemented in the form of VNFs). Further optionally, an instance corresponding to the target VNF may be configured by using the NFVO or an element manage system (EMS) or a virtualized network function management entity (VNFM).

S404: Update a network service database according to the configured VNFFG and the configured network function instance.

A related network service database is updated according to the configured VNFFG and the configured network function instance that correspond to the target VNF. A database including an NS Catalog database, a VNF Catalog database, an NFV Instances database, an network function virtualization infrastructure (NFVI) Resources database, or the like is updated. The NS Catalog database includes all network services that are already loaded, the VNF Catalog database includes all VNF Packages that are already loaded, the NFV Instances database includes all network service instances and VNF instances, and the NFVI Resources database includes all available NFVI resources.

S405: Acquire service logic update information corresponding to the target functional entity, to perform service allocation according to the service logic update information.

In implementation of this embodiment of the present invention, when a configuration update request is received, a NSD and a configuration file VNFD that are of a target functional entity corresponding to the configuration update request may be loaded, a forwarding graph VNFFG used to describe a service flow between network functions, and a corresponding network function instance may be configured, a database may be updated, and service logic update information after configuration update may be acquired, so that service allocation is performed according to the service logic update information.

Figure 5:
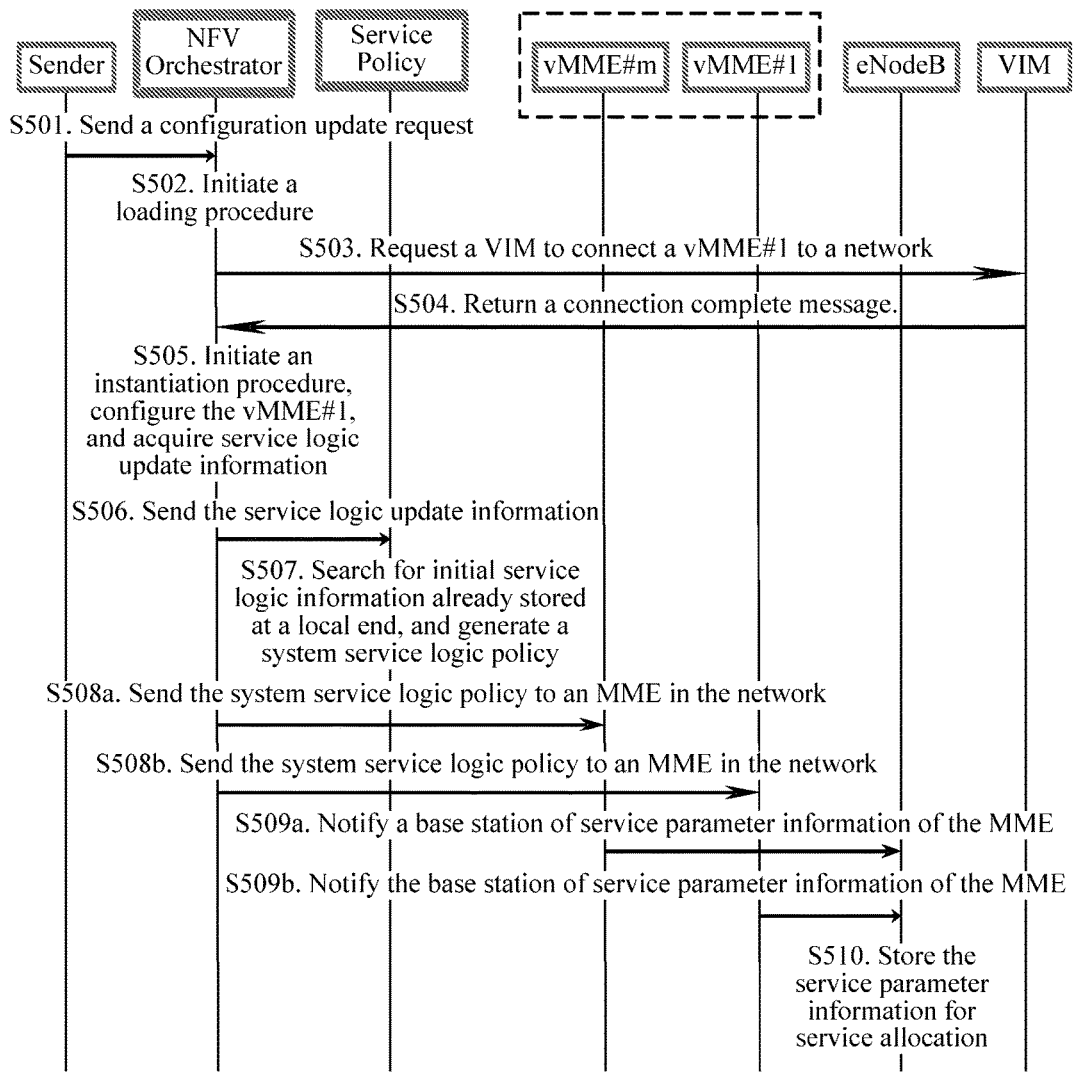
FIG. 5 is a schematic interaction diagram of an embodiment of a processing method for service allocation according to embodiments of the present invention.

Refer to FIG. 5, which is a schematic interaction diagram of an embodiment of a processing method for service allocation according to embodiments of the present invention. The method includes:

S501: Send a configuration update request.

A Sender in FIG. 5 may be any entity that sends, on behalf of a VNF developer, a VNFD to an NFVO, or may be a developer, or may be an entity in an service provider (SP) field, which is not limited in this embodiment of the present invention.

When a function node in a network needs to be added, replaced, or deleted, for example, currently, to promote demands, when PNF pMME#1 needs to be replaced with a VNF vMME#1, the Sender may send a configuration update request to the NFVO, and the NFVO initiates a network function update procedure, loads the vMME#1 to the network, and deletes the pMME#1. The function node may be a virtualized network function node VNF, or may include a physical network function node PNF. The configuration update request may include configuration information related to service logic of the added vMME#1.

S502: Initiate a loading procedure.

If the NFVO receives a configuration update request for adding a target VNF, that is, the vMME#1, the NFVO initiates a loading procedure, for example, loads an NSD and a virtualized network function configuration file VNFD of the vMME#1 to an NFV catalog.

S503: Request a VIM to connect a vMME#1 to a network.

Specifically, in this embodiment of the present invention, the virtualized infrastructure management (VIM) may control the vMME#1 to be connected to a base station eNodeB.

S504: Return a connection complete message.

The connection complete message is returned when the target VNF, that is, the vMME#1, is successfully connected to the eNodeB.

S505: Initiate an instantiation procedure, configure the vMME#1, and acquire service logic update information.

Further, after the loading is completed, a VNF instantiation procedure may be initiated, to configure a VNFFG used to describe a service flow between network functions, and a corresponding VNF instance for the target VNF, that is, the vMME#1. The VNFFG includes a VNF, a PNF, and a virtual link between network functions (or there is no PNF, and all network functions are implemented in the form of VNFs).

Further optionally, an instance corresponding to the target VNF may be configured by using a current NFV orchestration entity NFVO or an EMS (Element Management System, element manage system) or a VNFM.

A related network service database is updated according to the configured VNFFG and the configured network function instance that correspond to the vMME#1. Specifically, a database including an NS Catalog database, a VNF Catalog database, an NFV Instances database, an NFVI Resources database, or the like may be updated. The NS Catalog database includes all network services that are already loaded, the VNF Catalog database includes all VNF Packages that are already loaded, the NFV Instances database includes all network service instances and VNF instances, and the NFVI Resources database includes all available NFVI resources.

S506: Send the service logic update information.

After the vMME#1 is configured and the related network service database is updated, the replaced functional entity pMME#1 may be deleted, and service logic update information of the target VNF, that is, the vMME#1, may be acquired. In this embodiment of the present invention, the service logic update information may include configuration information that is obtained after configuration update is performed on the vMME#1 added to the network, link information and service selection policy information that correspond to the vMME#1, and the like.

The link information may be an IP address, and the following are examples of a policy that may be included in the service selection policy:

1) sending all new services to the vMME#1;
2) transferring a service flow on a vMME#m to the vMME#1;
3) allocating services to the vMME#m and the vMME#1 according to a weighting factor; and
4) sending all services of a particular service type such as a service type A to the vMME#1.

The vMME#m is an MME already existing in the network. Further, the service selection policy may be obtained based on a static configuration or by using a rule issued by a related system, which is not limited in this embodiment of the present invention.

S507: Search for initial service logic information already stored at a local end, and generate a system service logic policy.

A deployed service policy entity, that is, a Service Policy in FIG. 5, is responsible for implementing management of a VNF service logic policy in a network service orchestration function, and is specifically a Network service policy in an EPC network. After receiving the service logic update information corresponding to the added vMME#1, the service policy entity Service Policy searches for and acquires initial service logic information of MMEs that is already stored at the local end, and generates a system service logic policy according to the service logic update information and the stored initial service logic information.

S508a: Send the system service logic policy to an MME in the network.

S508b: Send the system service logic policy to an MME in the network.

The Service Policy generates, according to the acquired service logic update information corresponding to the added vMME#1 and the initial service logic information of the MMEs that is already stored at the local end, a system service logic policy including current service allocation information, and sends the system service logic policy to MMEs in the network, to instruct the MMEs to adjust service parameter information.

S509a: Notify a base station of service parameter information of the MME.

S509b: Notify the base station of service parameter information of the MME.

The MMEs adjust the service parameter information of the MMEs according to an indication of the system service logic policy, where the service parameter information includes a weighting factor. For example, each MME adjusts, according to the service allocation information included in the system service logic policy, a weighting factor corresponding to each MME, and pushes the modified service parameter information to the corresponding eNodeB.

S510: Store the service parameter information for service allocation.

The eNodeB stores the service parameter information, and allocates a received service according to the service parameter information.

In implementation of this embodiment of the present invention, service logic update information that is obtained after configuration update is performed on a target VNF, that is, an MME, and initial service logic information already stored at a local end may be acquired, to generate a system service logic policy, and the system service logic policy may be sent to MMEs in a network, so that each MME adjusts service parameter information according to the system service logic policy, and notifies a corresponding base station; and the base station performs service allocation according to the adjusted service parameter information, which implements service allocation based on service logic information that corresponds to functional entities in the network, thereby better satisfying a requirement for load balance.

Figure 6:
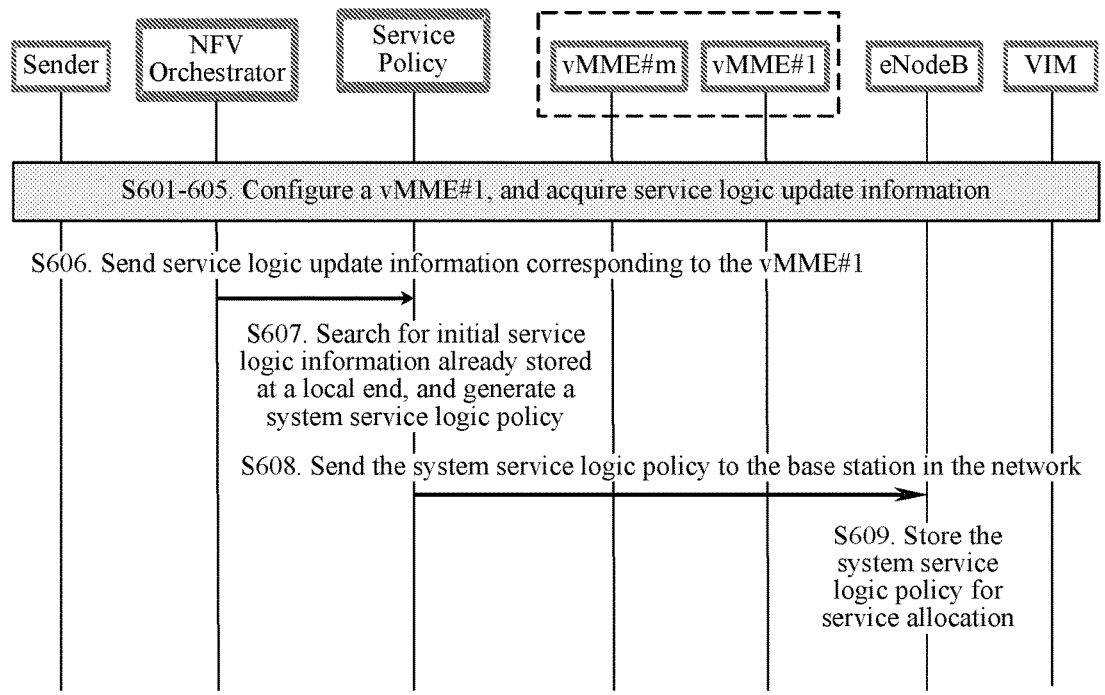
FIG. 6 is a schematic interaction diagram of an embodiment of another processing method for service allocation according to embodiments of the present invention.

Refer to FIG. 6, which is a schematic interaction diagram of an embodiment of another processing method for service allocation according to embodiments of the present invention. The method includes:

S601 to S605: Configure a vMME#1, and acquire service logic update information.

S601 to S605 in this embodiment of the present invention respectively correspond to corresponding descriptions of S501 to S505 in the embodiment corresponding to FIG. 5, and details are not described herein again.

S606: Send service logic update information corresponding to the vMME#1.

After the vMME#1 is configured and a related network service database is updated, the service logic update information of a target functional entity, that is, the vMME#1, may be acquired. Specifically, in this embodiment of the present invention, the service logic update information may include configuration information that is obtained after configuration update is performed on the vMME#1 added to a network, link information and service selection policy information that correspond to the vMME#1, and the like.

S607: Search for initial service logic information already stored at a local end, and generate a system service logic policy.

After receiving the service logic update information corresponding to the added vMME#1, a service policy entity Service Policy searches for and acquires initial service logic information of MMEs that is already stored at the local end, and generates a system service logic policy according to the service logic update information and the initial service logic information.

S608: Send the system service logic policy to a base station in the network.

Further, the Service Policy may further directly send the generated system service logic policy to eNodeBs in the network.

S609: Store the system service logic policy for service allocation.

Each eNodeB stores the received system service logic policy, and allocates a received service according to the system service logic policy.

In implementation of this embodiment of the present invention, a system service logic policy may be generated by acquiring service logic update information corresponding to a target functional entity and by referring to initial service logic information already stored at a local end, and the system service logic policy may be directly sent to base stations in a network, so that the base stations perform service allocation according to the system service logic policy, thereby better satisfying a requirement for load balance.

Figure 7:
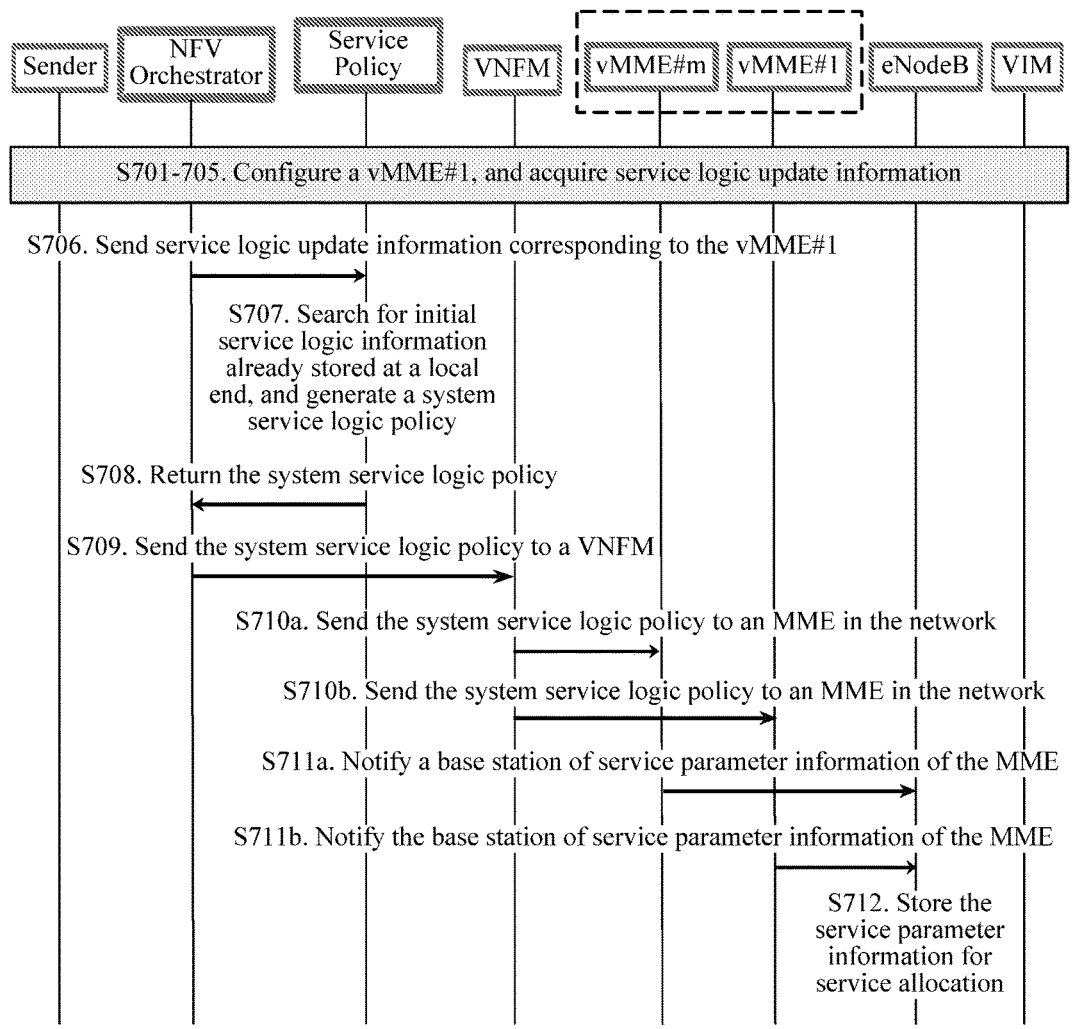
FIG. 7 is a schematic interaction diagram of an embodiment of still another processing method for service allocation according to embodiments of the present invention.

Refer to FIG. 7, which is a schematic interaction diagram of an embodiment of still another processing method for service allocation according to embodiments of the present invention. The method includes:

S701 to S705: Configure a vMME#1, and acquire service logic update information.

S701 to S705 in this embodiment of the present invention respectively correspond to corresponding descriptions of S501 to S505 in the embodiment corresponding to FIG. 5, and details are not described herein again.

S706: Send service logic update information corresponding to the vMME#1.

S707: Search for initial service logic information already stored at a local end, and generate a system service logic policy.

After receiving the service logic update information corresponding to the added vMME#1, a service policy entity Service Policy searches for and acquires initial service logic information of MMEs that is already stored at the local end, and generates a system service logic policy according to the service logic update information and the initial service logic information.

S708: Return the system service logic policy.

The Service Policy generates, according to the acquired service logic update information corresponding to the added vMME#1 and the initial service logic information of the MMEs that is already stored at the local end, a system service logic policy including current service allocation information.

S709: Send the system service logic policy to a VNFM.

The Service Policy may send the acquired system service logic policy to the virtualized network function management entity VNFM by using an NFV orchestration entity NFVO.

S710*a*: Send the system service logic policy to an MME in the network.

S710*b*: Send the system service logic policy to an MME in the network.

The Service Policy sends the generated system service logic policy to MMEs in the network by using the VNFM, so that the MMEs adjust service parameter information according to the system service logic policy.

S711*a*: Notify a base station of service parameter information of the MME.

S711*b*: Notify the base station of service parameter information of the MME.

The MMEs adjust the service parameter information of the MMEs according to an indication of the system service logic policy, where the service parameter information includes a weighting factor. For example, each MME adjusts, according to the system service logic policy, a weighting factor corresponding to each MME, and pushes the modified service parameter information to a corresponding eNodeB.

S712: Store the service parameter information for service allocation.

The eNodeB stores the service parameter information pushed by each MME, and allocates a received service according to the service parameter information.

In implementation of this embodiment of the present invention, after generating a system service logic policy by acquiring service logic update information corresponding to a target VNF, that is, an MME, and by referring to initial service logic information already stored at a local end, a service policy entity may send the system service logic policy to MMEs in a network by using a VNFM, so that each MME adjusts service parameter information according to the system service logic policy, and instructs a corresponding base station to perform service allocation according to the adjusted service parameter information, thereby better stratifying a requirement for load balance.

Figure 8:
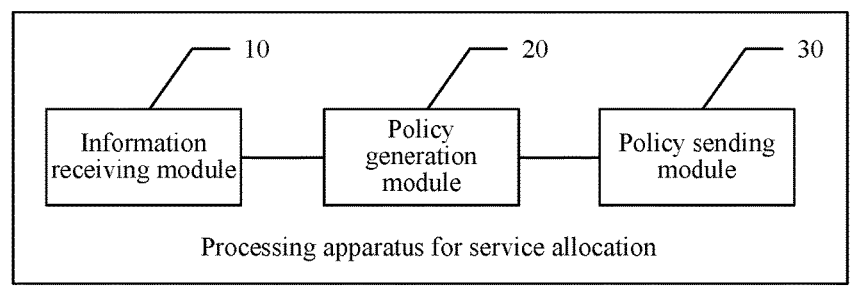
FIG. 8 is a schematic structural composition diagram of an embodiment of a processing apparatus for service allocation according to embodiments of the present invention.

Refer to FIG. 8, which is a schematic structural composition diagram of an embodiment of a processing apparatus for service allocation according to an embodiment of the present invention. The apparatus in this embodiment of the present invention includes an information receiving module 10, a policy generation module 20, and a policy sending module 30.

The information receiving module 10 is configured to receive service logic update information that is obtained after configuration update is performed on a functional entity in a network.

In a specific embodiment, the functional entity may include a network node such as a PGW, a SGW, an HSS, an MME, and the network node may be virtual, that is, a VNF, or may be physical, that is, a PNF.

A logical node, that is, a service policy entity configured to perform policy management on a functional entity, may be added to an NFV system. The service policy entity may be an independent unit entity, or may be located in an NFVO or a DNS, or even in a VNF. A deployment position of the service policy entity is not limited in this embodiment of the present invention. Further, the apparatus in this embodiment of the present invention may be disposed in the added service policy entity.

The service logic update information is information that is obtained after a functional entity in the network on which an update operation needs to be performed completes the update operation and that includes configuration information, link information and service selection policy information that correspond to the functional entity, and the like. The update operation includes an adding operation, a modifying operation or a deleting operation.

The policy generation module 20 is configured to search for initial service logic information already stored at a local end, and generate a system service logic policy according to the service logic update information and the initial service logic information.

The policy sending module 30 is configured to send the system service logic policy to service entities in the network that execute service processing, to instruct the service entities in the network to execute service allocation on the functional entity in the network.

After the information receiving module 10 receives the service logic update information that is obtained after the configuration update is performed on the functional entity in the network, the policy generation module 20 may generate a system service logic policy including a specific service policy with reference to service logic information, already stored at a local end, of another related functional entity, that is, the initial service logic information, and the policy sending module 30 sends the system service logic policy to the service entities in the network, to instruct to perform service allocation.

Further optionally, the policy sending module 30 is specifically configured to send the system service logic policy to mobility management entities MMEs in the network that are obtained after configuration update is performed, so that the mobility management entities MMEs execute service allocation on the functional entity in the network according to the system service logic policy, for example, adjust, according to the system service logic policy, service parameter information corresponding to the mobility management entities MMEs, where the service parameter information may include weighting factors corresponding to the mobility management entities MMEs.

Further optionally, the policy sending module 30 is specifically configured to send the system service logic policy to base stations in the network, so that the base stations execute service allocation on the functional entity in the network according to the system service logic policy.

Further optionally, the policy sending module 30 is specifically configured to send the system service logic policy to, so that the VNFM executes service allocation on the functional entity in the network according to the system service logic policy, for example, instructs each functional entity in the network to adjust, according to the system service logic policy, service parameter information corresponding to the functional entity.

In implementation of this embodiment of the present invention, a system service logic policy may be generated according to service logic update information that is obtained after configuration update is performed on a functional entity in a network and according to initial service logic information already stored at a local end, and the system service logic policy may be sent to service entities in the network that execute service processing, to instruct the service entities to execute service allocation on a functional entity in the network, thereby better satisfying a requirement for load balance.

Figure 9:
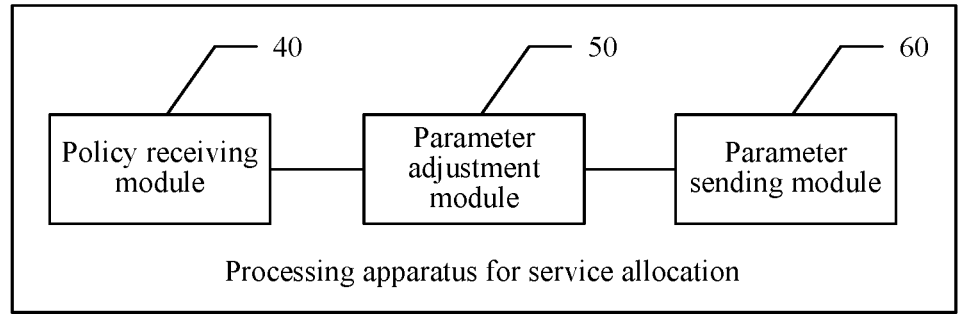
FIG. 9 is a schematic structural composition diagram of an embodiment of another processing apparatus for service allocation according to embodiments of the present invention.

Refer to FIG. 9, which is a schematic structural composition diagram of an embodiment of another processing apparatus for service allocation according to embodiments of the present invention. The apparatus in this embodiment of the present invention may be disposed in a functional entity such as an MME, or an HSS. The apparatus in this embodiment of the present invention includes a policy receiving module 40, a parameter adjustment module 50, and a parameter sending module 60.

The policy receiving module 40 is configured to receive a system service logic policy sent by a service policy entity.

The system service logic policy is used to instruct service entities in a network to execute service allocation on a functional entity in the network, and may include a policy for performing service allocation on functional entities in the network, for example, include a policy for controlling to send a new service or all services of a specified type to a target functional entity, to transfer a service on a particular functional entity to a target functional entity, or allocate services to a functional entity already existing in the network and a target functional entity according to a weighting factor.

The parameter adjustment module 50 is configured to adjust service parameter information according to the system service logic policy received by the policy receiving module 40.

After the policy receiving module 40 receives service logic information, the parameter adjustment module 50 may adjust the service parameter information according to the system service logic policy, for example, a weighting factor corresponding to each MME.

The parameter sending module 60 is configured to send the adjusted service parameter information to a corresponding base station, so that the base station performs service allocation according to the service parameter information.

The base station may store service parameter information that corresponds to MMEs connected to the base station and that is sent by the parameter sending module 60, and performs, according to the service parameter information, allocation for a service request that arrives.

In implementation of this embodiment of the present invention, service parameter information corresponding to a corresponding functional entity may be adjusted according to a received system service logic policy, and the adjusted service parameter information may be pushed to a corresponding base station, to instruct the base station to perform service allocation.

Figure 10:
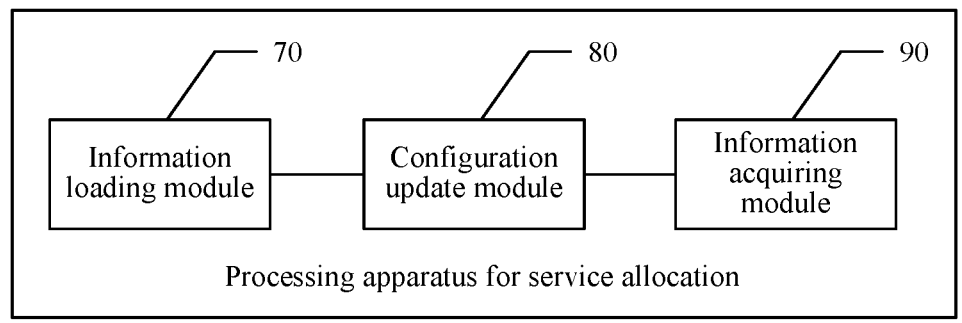
FIG. 10 is a schematic structural composition diagram of an embodiment of still another processing apparatus for service allocation according to embodiments of the present invention.

Refer to FIG. 10, which is a schematic structural composition diagram of an embodiment of still another processing apparatus for service allocation according to embodiments of the present invention. The apparatus in this embodiment of the present invention may be disposed in a node such as an NFVO configured to configure a related functional entity. The apparatus in this embodiment of the present invention includes an information loading module 70, a configuration update module 80, and an information acquiring module 90.

The information loading module 70 is configured to receive a configuration update request that carries configuration information of a target functional entity, and load the target functional entity corresponding to the configuration update request.

If an NFVO receives a configuration update request for adding or modifying a target VNF, the information loading module 70 may initiate a loading procedure, for example, load an NSD and a VNFD of the target VNF to an NFV catalog.

The configuration update module 80 is configured to configure the target functional entity according to the configuration information of the target functional entity, to complete configuration update on a functional entity in a network.

The configuration update module 80 initiates an instantiation procedure of the target VN to extend a specific configuration for the target VNF, and update a related database in the network.

The information acquiring module 90 is configured to acquire service logic update information corresponding to the target functional entity, to perform service allocation according to the service logic update information.

The information acquiring module 90 may acquire service logic update information corresponding to a current target VNF, and send the service logic update information to a service policy entity in the network, so that the service policy entity instructs, according to the acquired service logic update information, a related functional entity to adjust a forwarding parameter for service allocation.

Figure 11:
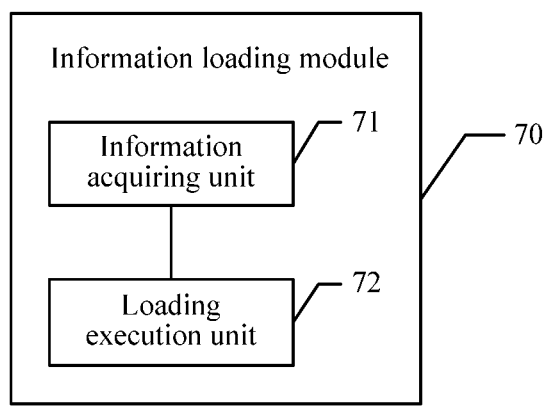
FIG. 11 is a schematic structural composition diagram of an information loading module in FIG. 10.

Further, referring to FIG. 11, the information loading module 70 of the processing apparatus for service allocation in this embodiment of the present invention may include:
  an information acquiring unit 71, configured to: when the configuration update request that carries the configuration information of the target functional entity is received, acquire a NSD and a VNFD that correspond to the target functional entity, where
  if the information loading module 70 receives a configuration update request for adding or modifying a target VNF, the information acquiring unit 71 may acquire an NSD corresponding to the target VNF and a configuration file VNFD of the target VNF, where at least one of the NSD and the configuration file VNFD records service logic update information that includes link information and a service selection policy that correspond to the target VNF, and the like; and
  a loading execution unit 72, configured to load the network service descriptor NSD and the virtualized network function configuration file VNFD that correspond to the target functional entity and that are acquired by the information acquiring unit 71 to a network function virtualization NFV catalog.

In a specific embodiment, before the information acquiring unit 71 loads the NSD corresponding to the target VNF to the NFV catalog, a current NSD may be modified by using a current NFVO. The modified NSD is submitted to the NFVO, and the NFVO verifies the modified NSD. The verification process includes detecting whether a VNF package corresponding to the VNF exists in an NS, detecting whether a hosted element and an external interface providing a network service exist, and the like.

In a specific embodiment, when the information acquiring unit 71 loads the configuration file VNFD corresponding to the target VNF, the information acquiring unit 71 may submit a package VNF Package corresponding to the target VNF to the NFVO, where the VNF Package includes the virtualized network function configuration file VNFD of the VNF, a software image, another component configured to detect integrity and validity of the package, and the like. The information acquiring unit 71 performs verification processing on the configuration file VNFD, for example, performs an operation, such as checking whether the hosted element exists, or verifying authenticity and reliability of the VNFD by using a certificate included in the VNFD, to load the target VNF to the VNF catalog.

Figure 12:
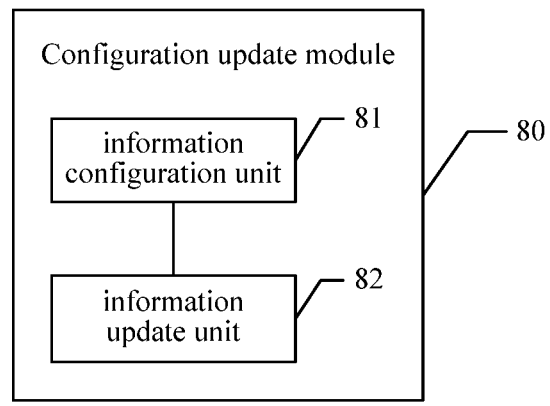
FIG. 12 is a schematic structural composition diagram of a configuration update module in FIG. 10.

Further, referring to FIG. 12, the configuration update module 80 of the processing apparatus for service allocation in this embodiment of the present invention may include:
  an information configuration unit 81, configured to configure a VNFFG and a network function instance for the target functional entity, where
  further, after the information loading module 70 completes the loading, the information configuration unit 81 may initiate a network function instantiation procedure, to configure the VNFFG and a corresponding VNF instance for the target functional entity such as the target VNF; and specifically, a current NFVO configures, according to the target VNF, a VNFFG used to describe a service flow between network functions. The VNFFG includes a VNF, a PNF, and a virtual link between the network functions (or there is no PNF, and all network functions are implemented in the form of VNFs); and
  an information update unit 82, configured to update a network service database according to the VNFFG and the network function instance that are configured by the information configuration unit 81, to complete the configuration update on the functional entity in the network.

The information update unit 82 may update a related network service database according to the VNFFG and the configured network function instance that correspond to the target VNF and that are configured by the information configuration unit 81. Specifically, a database including an NS Catalog database, a VNF Catalog database, an NFV Instances database, an NFVI Resources database, or the like is updated. The NS Catalog database includes all network services that are already loaded, the VNF Catalog database includes all VNF Packages that are already loaded, the NFV Instances database includes all network service instances and VNF instances, and the NFVI Resources database includes all available NFVI resources.

In implementation of this embodiment of the present invention, when a configuration update request is received, a NSD and a configuration file VNFD that are of a target functional entity corresponding to the configuration update request may be loaded, a forwarding graph VNFFG used to describe a service flow between network functions, and a corresponding network function instance may be configured, a database may be updated, and service logic update information after configuration update may be acquired, so that service allocation is performed according to the service logic update information.

Figure 13:
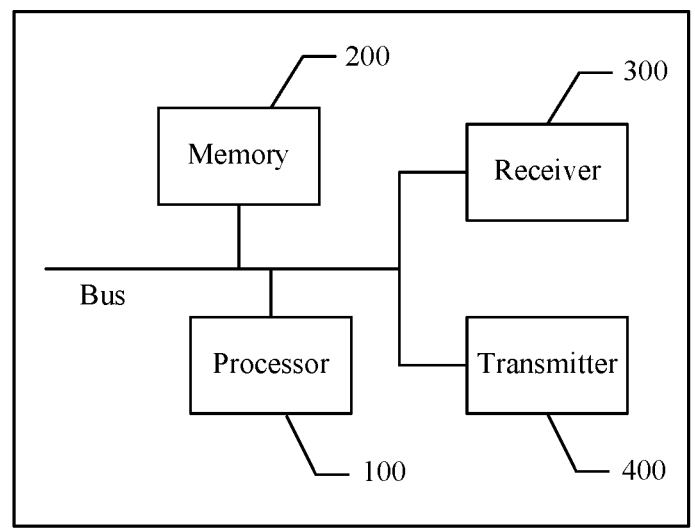
FIG. 13 is a schematic structural composition diagram of a network device according to an embodiment of the present invention.
Figure 14:
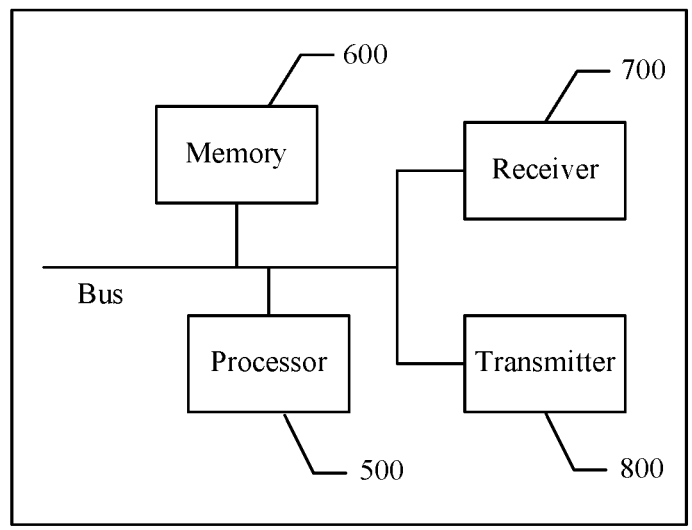
FIG. 14 is a schematic structural composition diagram of another network device according to an embodiment of the present invention.
Figure 15:
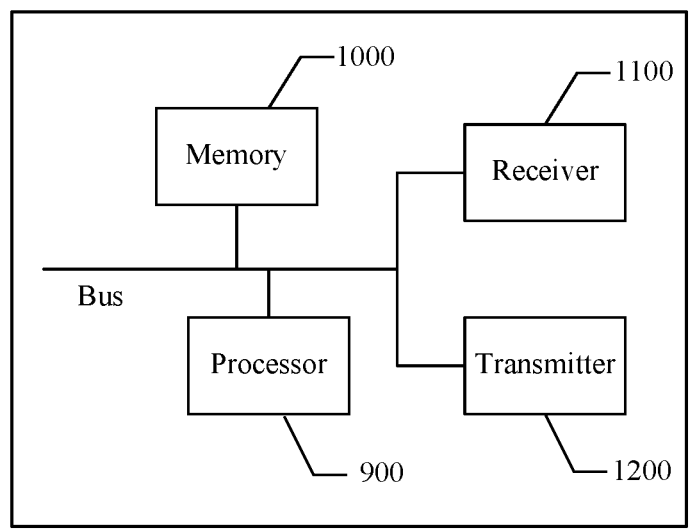
FIG. 15 is a schematic structural composition diagram of still another network device according to an embodiment of the present invention.

Further specifically, FIG. 13 is a schematic structural composition diagram of a network device according to an embodiment of the present invention. The network device in this embodiment of the present invention includes: a receiver 300, a transmitter 400, a memory 200, and a processor 100. The memory 200 may be a high-speed RAM memory, or may be a non-volatile memory (non-volatile memory), such as at least one magnetic disk storage. The memory 200 stores, as a computer storage medium, a corresponding application program (or instructions), and the like. The receiver 300, the transmitter 400, the memory 200, and the processor 100 implement a data connection by using a bus, or may implement a data connection in another manner. This embodiment is described by using a bus connection as an example.

The processor 100 performs the following steps:
  receiving, by using the receiver 300, service logic update information that is obtained after configuration update is performed on a functional entity in a network;
  searching for initial service logic information stored in the memory 200, and generating a system service logic policy according to the service logic update information and the initial service logic information; and
  sending, by using the transmitter 400, the system service logic policy to service entities in the network that execute service processing, where
  the system service logic policy is used to instruct the service entities in the network to execute service allocation on the functional entity in the network.

Specifically, a logical node, that is, a service policy entity configured to perform policy management on a functional entity, may be added to an NFV system. The service policy entity may be an independent unit entity, or may be located in an NFVO or a DNS, or even in a VNF. A deployment position of the service policy entity is not limited in this embodiment of the present invention.

Optionally, when performing the step of sending the system service logic policy to service entities in the network that execute service processing, the processor 100 specifically performs the following step:
  sending the system service logic policy to mobility management entities MMEs in the network that are obtained after configuration update is performed, so that the mobility management entities MMEs execute service allocation on the functional entity in the network according to the system service logic policy.

Optionally, when performing the step of sending the system service logic policy to service entities in the network that execute service processing, the processor 100 specifically performs the following step:
  sending the system service logic policy to base stations in the network, so that the base stations execute service allocation on the functional entity in the network according to the system service logic policy.

Optionally, when performing the step of sending the system service logic policy to service entities in the network that execute service processing, the processor 100 specifically performs the following step:
  sending the system service logic policy to a virtualized network function management entity VNFM, so that the virtualized network function management entity VNFM executes service allocation on the functional entity in the network according to the system service logic policy.

In implementation of this embodiment of the present invention, a system service logic policy may be generated according to service logic update information that is obtained after configuration update is performed on a functional entity in a network and according to initial service logic information already stored at a local end, and the system service logic policy may be sent to service entities in the network that execute service processing, to instruct the service entities to execute service allocation on a functional entity in the network, thereby better satisfying a requirement for load balance.

Further specifically, FIG. 12 is a schematic structural composition diagram of another network device according to embodiments of the present invention. The network device in this embodiment of the present invention includes: a receiver 700, a transmitter 800, a memory 600, and a processor 500. The memory 600 may be a high-speed RAM memory, or may be a non-volatile memory (non-volatile memory), such as at least one magnetic disk storage. The memory 600 stores, as a computer storage medium, a corresponding application program, and the like. The receiver 700, the transmitter 800, the memory 600, and the processor 500 implement a data connection by using a bus, or may implement a data connection in another manner. This embodiment is described by using a bus connection as an example.

The processor 500 performs the following steps:
  receiving, by using the receiver 700, a system service logic policy sent by a service policy entity;
  adjusting service parameter information according to the received system service logic policy, where the service parameter information includes a weighting factor; and
  sending the adjusted service parameter information to a corresponding base station by using the transmitter 800, so that the base station performs service allocation according to the service parameter information.

The system service logic policy is used to instruct service entities in a network to execute service allocation on a functional entity in the network, and may include a policy for performing service allocation on functional entities in the network, for example, include a policy for controlling to send a new service or all services of a specified type to a target functional entity, to transfer a service on a particular functional entity to a target functional entity, or allocate services to a functional entity already existing in the network and a target functional entity according to a weighting factor.

In implementation of this embodiment of the present invention, service parameter information corresponding to a corresponding functional entity may be adjusted according to a received system service logic policy, and the adjusted service parameter information may be pushed to a corresponding base station, to instruct the base station to perform service allocation.

Further specifically, FIG. 13 is a schematic structural composition diagram of still another network device (or computing device, or computing system,) according to an embodiment of the present invention. The network device in this embodiment of the present invention includes: a receiver 1100, a transmitter 1200, a memory 1000, and a processor 900. The memory 1000 may be a high-speed RAM memory, or may be a non-volatile memory (non-volatile memory), such as at least one magnetic disk storage. The memory 1000 stores, as a computer storage medium, a corresponding application program, and the like. The receiver 1100, the transmitter 1200, the memory 1000, and the processor 900 implement a data connection by using a bus, or may implement a data connection in another manner. This embodiment is described by using a bus connection as an example.

The processor 900 performs the following steps:
  receiving, by using the receiver 1100, a configuration update request that carries configuration information of a target functional entity, and loading the target functional entity corresponding to the configuration update request;

configuring the target functional entity according to the configuration information of the target functional entity, to complete configuration update on a functional entity in a network; and acquiring service logic update information corresponding to the target functional entity, to perform service allocation according to the service logic update information.

Further, when performing the step of the receiving a configuration update request that carries configuration information of a target functional entity, and loading the target functional entity corresponding to the configuration update request, the processor 900 specifically performs the following steps:

when receiving the configuration update request that carries the configuration information of the target functional entity, acquiring a NSD and a VNFD that correspond to the target functional entity; and loading the NSD and the VNFD that correspond to the target functional entity to a network function virtualization NFV catalog, where at least one of the NSD and the VNFD records the service logic update information that includes link information and a service selection policy that correspond to the target functional entity.

Further, when performing the step of the configuring the target functional entity according to the configuration information of the target functional entity, to complete configuration update on a functional entity in a network, the processor 900 specifically performs the following steps:

configuring a VNFFG and a network function instance for the target functional entity; and updating a network service database according to the configured VNFFG and the configured network function instance, to complete the configuration update on the functional entity in the network.

In implementation of this embodiment of the present invention, configuration update may be performed on a target functional entity according to a received configuration update request, and service logic update information that correspond to the target functional entity after the configuration update may be acquired, so that service allocation is performed according to the service logic update information.

A person of ordinary skill in the art may understand that all or some of the processes of the methods in the embodiments may be implemented by a computer program (or instructions) instructing relevant hardware. The instructions (or program) may be stored in a non-transitory computer-readable storage medium. When the instructions (or program) are executed, the device (or computing system, or computing device) performs a process of the methods in the embodiments described. The foregoing storage medium may include: a magnetic disk, an optical disc, a read-only memory (ROM), a random access memory (RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A processing method for service allocation, comprising:
receiving, by a network device, service logic update information that is obtained after a configuration update is performed on a functional entity in a network;
searching for initial service logic information already stored locally on the network device, and generating a system service logic policy according to the service logic update information and the initial service logic information; and
sending the system service logic policy to service entities in the network that execute service processing, wherein
the system service logic policy is used to instruct the service entities in the network to execute service allocation on the functional entity in the network,
wherein the sending the system service logic policy to service entities in the network that execute service processing comprises:
sending the system service logic policy to mobility management entities (MMEs) in the network that are obtained after the configuration update is performed, so that the MMEs execute service allocation on the functional entity in the network according to the system service logic policy.

2. The method according to claim 1, wherein
the service logic update information comprises any one or more of: configuration information that is obtained after the configuration update is performed on the functional entity in the network, or link information or service selection policy information that corresponds to the functional entity, and wherein the configuration update comprises adding, modifying, or deleting a functional entity in the network.

3. The method according to claim 1, wherein the sending the system service logic policy to service entities in the network that execute service processing comprises:
sending the system service logic policy to base stations in the network, so that the base stations execute service allocation on the functional entity in the network according to the system service logic policy.

4. The method according to claim 1, wherein the sending the system service logic policy to service entities in the network that execute service processing comprises:
sending the system service logic policy to a virtualized network function manager (VNFM), so that the VNFM executes service allocation on the functional entity in the network according to the system service logic policy.

5. A network device, comprising: a receiver, a transmitter, a memory, and a processor, wherein
the processor performs the following operations:
receiving, by the receiver, a configuration update request that carries configuration information of a target functional entity in a network, and loading the target functional entity corresponding to the configuration update request;
configuring the target functional entity according to the configuration information of the target functional entity, to complete the configuration update on the target functional entity; and
acquiring service logic update information corresponding to the target functional entity, to perform service allocation according to the service logic update information,
wherein the receiving a configuration update request that carries configuration information of a target functional entity comprises:

acquiring a network service descriptor (NSD) and a virtualized network function descriptor (VNFD) that correspond to the target functional entity, and wherein loading the target functional entity corresponding to the configuration update request comprises:

loading the NSD and the VNFD that correspond to the target functional entity to a network function virtualization NFV catalog, and wherein at least one of the NSD and the VNFD records the service logic update information that comprises link information and a service selection policy that correspond to the target functional entity.

6. The network device according to claim 5, wherein the configuring the target functional entity according to the configuration information of the target functional entity, to complete configuration update on a functional entity in a network comprises:

configuring a virtualized network function forwarding graph (VNFFG) and a network function instance for the target functional entity; and updating a network service database according to the configured VNFFG and the configured network function instance, to complete the configuration update on the functional entity in the network.

7. A network device, comprising: a receiver, a transmitter, a memory, and a processor, wherein the processor performs the following operations:

receiving, by the receiver, service logic update information that is obtained after a configuration update is performed on a functional entity in a network;

searching for initial service logic information stored in the memory, and generating a system service logic policy according to the service logic update information and the initial service logic information; and sending, by the transmitter, the system service logic policy to service entities in the network that execute service processing, wherein the system service logic policy is used to instruct the service entities in the network to execute service allocation on the functional entity in the network, wherein the sending the system service logic policy to service entities in the network that execute service processing comprises:

sending the system service logic policy to mobility management entities (MMEs) in the network that are obtained after the configuration update is performed, so that the MMEs execute service allocation on the functional entity in the network according to the system service logic policy.

8. The network device according to claim 7, wherein the sending the system service logic policy to service entities in the network that execute service processing comprises:

sending the system service logic policy to base stations in the network, so that the base stations execute service allocation on the functional entity in the network according to the system service logic policy.

9. The network device according to claim 7, wherein the sending the system service logic policy to service entities in the network that execute service processing comprises:

sending the system service logic policy to a virtualized network function manager (VNFM), so that the VNFM executes service allocation on the functional entity in the network according to the system service logic policy.

10. A non-transitory computer-readable storage medium, where the medium stores instructions, which when executed by a device, cause the device to perform a process for service allocation, the process comprising:

receiving, by a network device, service logic update information that is obtained after a configuration update is performed on a functional entity in a network;

searching for initial service logic information already stored locally on the network device, and generating a system service logic policy according to the service logic update information and the initial service logic information; and sending the system service logic policy to service entities in the network that execute service processing, wherein the system service logic policy is used to instruct the service entities in the network to execute service allocation on the functional entity in the network, wherein the sending the system service logic policy to service entities in the network that execute service processing comprises:

sending the system service logic policy to mobility management entities (MMES) in the network that are obtained after the configuration update is performed, so that the MMEs execute service allocation on the functional entity in the network according to the system service logic policy.

11. The medium according to claim 10, wherein the sending the system service logic policy to service entities in the network that execute service processing comprises:

sending the system service logic policy to base stations in the network, so that the base stations execute service allocation on the functional entity in the network according to the system service logic policy.

12. The medium of according to claim 10, wherein the sending the system service logic policy to service entities in the network that execute service processing comprises:

sending the system service logic policy to a virtualized network function manager (VNFM), so that the VNFM executes service allocation on the functional entity in the network according to the system service logic policy.

13. The medium according to claim 10, wherein the service logic update information comprises any one or more of: configuration information that is obtained after the configuration update is performed on the functional entity in the network, or link information or service selection policy information that corresponds to the functional entity, and wherein the configuration update comprises adding, modifying, or deleting a functional entity in the network.

* * * * *